(12) United States Patent
Borra et al.

(10) Patent No.: US 11,118,963 B2
(45) Date of Patent: Sep. 14, 2021

(54) LIGHT MELANOPIC ACTIVITY INDICATOR

(71) Applicant: SIGNIFY HOLDING B.V., Eindhoven (NL)

(72) Inventors: Tobias Borra, Rijswijk (NL); Marcel Petrus Lucassen, Landsmeer (NL); Dragan Sekulovski, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/959,843

(22) PCT Filed: Dec. 20, 2018

(86) PCT No.: PCT/EP2018/086106
§ 371 (c)(1),
(2) Date: Jul. 2, 2020

(87) PCT Pub. No.: WO2019/134841
PCT Pub. Date: Jul. 11, 2019

(65) Prior Publication Data
US 2020/0370952 A1    Nov. 26, 2020

(30) Foreign Application Priority Data

Jan. 2, 2018  (EP) ..................................... 18150020

(51) Int. Cl.
*G01J 1/14* (2006.01)
(52) U.S. Cl.
CPC ....................................... *G01J 1/14* (2013.01)
(58) Field of Classification Search
CPC .. G01J 1/14; G02B 5/285; G02B 5/22; G02B 5/282; A61M 21/02; A61M 21/00; A61M 21/0094; A61N 5/0618; G02C 7/104
(Continued)

(56) References Cited

U.S. PATENT DOCUMENTS 3,413,066 A    11/1968  Biber et al.
9,606,277 B2 *  3/2017  Blair ...................... G02C 7/104
(Continued)

FOREIGN PATENT DOCUMENTS

| DE | 10350053 A1 | 6/2005 |
| DE | 202012007507 U1 | 8/2013 |
| WO | 2016145064 A1 | 9/2016 |

OTHER PUBLICATIONS

Anonymous: "File: Munsellcolorwheel.png—Wikipedia, The Free Encyclopedia," May 30, 2015, Retrived on Mar. 13, 2019 (5 Pages).
(Continued)

*Primary Examiner* — Hoa Q Pham (57) ABSTRACT

The invention provides a light indicator (100) for use in evaluating a quantity of melanopsin active radiation, the light indicator (100) comprising a light indicator element (110) comprising a sensing area (111), wherein the light indicator element (110) comprises a light reflecting element (120) configured to reflect at least part of light illuminating the sensing area (111) having one or more wavelengths selected from the wavelength range of an absorption band of melanopsin in the visible wavelength range and configured to absorb at least part of light illuminating the sensing area (111) having one or more wavelengths in the visible wavelength range outside the wavelength range of the absorption band of melanopsin in the visible wavelength range; and a non-sensing area (130) configured adjacent to the sensing area (111), wherein the non-sensing area (130) has an achromatic color having a lightness in the range corresponding to the lightness of shades of gray.

13 Claims, 6 Drawing Sheets

(58) Field of Classification Search
USPC .................................................. 356/213–218
See application file for complete search history.

(56) References Cited

U.S. PATENT DOCUMENTS

| | | | |
|---|---|---|---|
| 9,739,916 B2* | 8/2017 | Weber | G02B 5/282 |
| 10,471,231 B2* | 11/2019 | Moore-Ede | A61M 21/0094 |
| 2017/0208673 A1 | 7/2017 | Schlangen et al. | |

OTHER PUBLICATIONS

Retrieved From the Internet: URL:https://web.archive.org/web/20171017025211/http://shop.kremerpigments.com/media/image/thumbnail/10300_7_720x600.jpg, Retrived on May 5, 2021 (One Page).

* cited by examiner

LIGHT MELANOPIC ACTIVITY INDICATOR

CROSS-REFERENCE TO PRIOR APPLICATIONS

This application is the U.S. National Phase application under 35 U.S.C. § 371 of International Application No. PCT/EP2018/086106, filed on Dec. 20, 2018, which claims the benefit of European Patent Application No. 18150020.8, filed on Jan. 2, 2018. These applications are hereby incorporated by reference herein.

FIELD OF THE INVENTION

The invention relates to a light indicator as well as to a kit of parts comprising such light indicator.

BACKGROUND OF THE INVENTION

The impact of light on the circadian rhythm is known in the art. For instance, WO2016145064 describes an apparatus for effecting a circadian outcome for an individual, the apparatus including an article of eyewear that is disposed relative to one or both eyes of an individual, the article of eyewear having one or more filter elements configured to controllably attenuate spectral components of light incident on the eyewear; the spectral components are in circadian-active wavelength ranges; and the one or more filter elements are controlled based on at least information associated with a circadian outcome of the individual. Related systems, methods and computer program products are provided.

SUMMARY OF THE INVENTION

Critical to our sleep/wake cycle is melatonin, a hormone that promotes sleep during night time. Melatonin is a sleep supportive hormone that we only produce around (and during) our usual bedtime. Light exposure during the evening and at night suppresses the natural production of melatonin. Hence, it appears that light regulates the so-called non-visual responses. These responses include what is known as circadian responses (e.g. 24 h rhythms in physiology and behavior) as well as the acute effects of light (e.g. increase alertness and melatonin suppression).

Recently, a new photo receptor has been described; the intrinsically photosensitive retinal ganglion cells (ipRGCs). This new photoreceptor seems to play a key role in non-visual responses in mammals. The photo pigment present in this photo receptor is melanopsin and its action spectrum shows a peak of sensitivity at about 470-500 nm. Because of its key role, non-visual responses to light can be enhanced by exposure to short wavelengths or blue enriched white light sources. However, enhancing non-visual responses is not always desirable. It seems that there may be a negative impact of light at night on sleep quality, especially in the hours before bedtime. These findings have been linked to suppression of the melatonin hormone. Additionally, light at night is known to increase alertness, something not desirable in the hours of sleep. The non-visual response resulting from activation of the melanopsin photo receptor may also be indicated as melanopic activation or melanopsin activation.

Currently, it is not possible to determine the amount of melanopic activation of a given illuminant without resorting to the use of a dedicated spectrophotometer and/or specific sensors and dedicated software. This makes it virtually impossible for the consumer to get an indication of the melanopic activity of a light source, or makes it complex and/or expensive.

Hence, it is an aspect of the invention to provide an alternative solution to easily detect and/or assess the melanopic active radiation at a specific position (also referred to as the melanopic illuminance at that position), which solution preferably further at least partly obviates one or more of above-described drawbacks. The present invention may have as object to overcome or ameliorate at least one of the disadvantages of the prior art, or to provide a useful alternative.

Amongst others, the basic idea of the invention is to provide a pigment that serves to indicate the amount of melanopic activity of a given illuminant. A possible use hereof would be in the form of a so called 'melanopic activity checker', where a checker chart can be used to get an approximation of the melanopic activity of a light source. The invention may provide a 'ballpark' estimate of the melanopic activity of a light source, allowing the user to determine whether this light source meets or exceeds a specific criterion.

In a first aspect, there is provides a light indicator for use in evaluating a melanopsin active radiation, the light indicator comprising: (a) a light indicator element comprising a sensing area, wherein the light indicator element comprises a light reflecting element configured to reflect at least part of light illuminating the sensing area having one or more wavelengths selected from the wavelength range of 440-530 nm and configured to absorb at least part of light illuminating the sensing area having one or more wavelengths in the visible wavelength range outside the wavelength range of 440-530 nm; and (b) a non-sensing area configured adjacent to the sensing area, wherein the non-sensing area has a neutral color having a lightness in the range corresponding to the lightness of shades of gray, preferably lightness of black to gray. The evaluation may include evaluating the flux of melanopsin active radiation on the sensing area of the light indicator or a melanopic illuminance on the sensing area.

The term "lightness" refers to the appearance of a light-reflecting surface or object, and specifically to the brightness of the surface relative to the brightness of white. The term "brightness" refers to the apparent amount of light reflected from an object (or originating from a light source). In colorimetry and color theory, lightness, also known as value or tone, is a representation of variation in the perception of a color or color space's brightness. It is one of the color appearance parameters of any color appearance model. Various color models have an explicit term for this property. The Munsell color model uses the term value, while the HSL color model, HCL color space and CIE Lab color space use the term lightness. Cf. https://en.wikipedia.org/wiki/Lightness. The lightness of "black" is by definition 0 whereas the lightness of "gray" is by definition 50, i.e. halfway between black and white, white being 100. (Note that the first recorded use of achromatic "gray" as a color name in the English language was in the year 700. This tone of gray is universally used as the standard for gray because it is that tone of gray which is halfway between white and black.) Cf. https://en.wikipedia.org/wiki/Shades_of_gray.

In this description, a "neutral" color refers to a substantially achromatic shade of gray, meaning literally that it is without color. Neutral colors have substantially no hue, substantially 0 color saturation (e.g. a chroma ≤5 in CIELAB color space) and a lightness between 0 and 100 (i.e.

between black and white respectively). Cf. https://en.wikipedia.org/wiki/Grey and https://en.wikipedia.org/wiki/Shades_of_gray.

With such light indicator, it is possible to assess the amount of melanopsin active radiation at a location, such as at a couch, at a desk, etc. Especially, with such light indicator it may be possible to easily detect the relative melanopic light flux, relative to the luminous flux of that light, at a specific position where the user desires to know this relative melanopic flux. With such light indicator it may also be possible to easily assess the absolute melanopic flux at a specific position where the user desires to know this flux. In this way, it can easily be detected (by a user) whether the light at such position has an amount of melanopsin active radiation above a desired threshold, for instance to stay awake, or below a desired threshold, e.g. at nocturnal times. One may also easily check whether a lighting device may be suitable for application at a specific location dependent upon the desired amount of melanopsin active radiation. The light indicator may be a strip-like or card-like element with e.g. a spot or patch within a background, or a plurality of spots within a background. The color and/or lightness of the spot and the background can be compared. Based on a predetermined, for example calibrated, relation between e.g. lightness of an object/color and and the flux of the light incident of the object/color, a user may determine whether a threshold is passed or not, or may even quantitatively (within certain ranges) determine the flux. The spot includes a specific material that is essentially selective for the melanopsin active radiation, which radiation may have essentially only intensity in the range of about 440-530, and may have a maximum in the range of about 470-500 nm.

As indicated above, the light indicator may thus be used for evaluating a melanopsin active radiation on a sensing area of the light indicator. Melanopsin active radiation is especially (visible) radiation having one or more wavelengths in the range of the (absorption band(s)) in the) absorption spectrum of melanopsin. The melanopsin active radiation is especially considered light having one or more wavelengths selected from the wavelength range of 440-530 nm, especially (at least) having one or more wavelengths selected from the wavelength range of 470-500 nm. Hence, daylight contains such melanopsin active radiation, but the intensity and relative content thereof changes over time from low with sunset and sunrise to high at noon. Melanopsin active radiation may be (visible) radiation that is absorbed by ipRGCs.

Figure 5A:
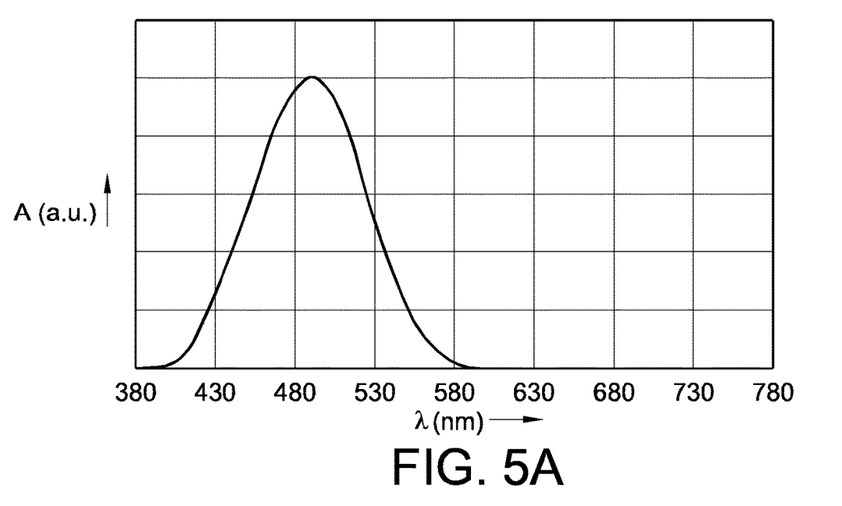
FIG. 5a shows the normalized absorption spectrum of the melanopsin pigment, further corrected for the transmission of the lens and interocular media of the human eye.

The luminous flux is the luminous energy per unit time emitted by a light source and is expressed in lumen. The luminous flux incident on a surface, e.g. on a sensing area, may also be indicated as illuminance and is expressed in lumens per square meter or lux. Both luminous flux and illuminance quantities relate to the visible spectrum in a wavelength range of about 380-780 nm and are wavelength-weighted by the luminosity function (also referred to as the photopic sensitivity $V(\lambda)$) to correlate with human brightness perception. Similarly, the quantities melanopic flux (in the present description also referred to as flux of melanopsin active radiation) and melanopic illuminance (in the present description also referred to as the flux of melanopsin active radiation on a sensing area) can be defined as the flux and illuminance related to the melanopsin active radiation part of the visible spectrum in a wavelength range of about 440-530 nm, especially 470-500 nm. Melanopic flux and melanopic illuminance are wavelength-weighted with the melanopic sensitivity function $m(\lambda)$ as shown in FIG. 5A or numerically spelled out in table L2 of the WELL Building Standard v1 with Q4 2017 addenda, downloadable at https://www.wellcertified.com/sites/default/files/resources/WELL%20Building%20Standard%20v1%20with%202017%20Q4%20addenda.pdf and incorporated herein by reference. Wherever in this description, For a reliable estimate of the melanopic flux on the sensing area it may be desirable to position the sensing area essentially perpendicular to the direction of propagation of the light of which the melanopic flux on the sensing area is to be evaluated. The sensing area may e.g. have size of e.g. 4-1000 mm$^2$, such as 4-500 mm$^2$. Further, the sensing area may be a contiguous area. The sensing area may be symmetric or asymmetrical. For instance, the sensing area may be square or circular, though other (polygon) shapes may also be possible.

The sensing area is comprised by a light indicator element. In other words, the light indicator comprises a light indicator element comprising the sensing area.

The light indicator element comprises a material that in embodiments may have a relatively low absorption, and thus a relatively high reflection, at the wavelength ranges of the melanopsin active radiation. The material may in embodiments have a relatively high absorption, and thus relatively low reflection, at essentially all other wavelengths in the visible range.

The terms "visible", "visible light" or "visible emission" refer to light having a wavelength in the range of about 380-780 nm. Hence, the material may have a relative even absorption for all wavelengths in the visible, except for one or more wavelengths in the range of the melanopsin active radiation. In embodiments, the absorption in the range of 470-500 nm may on average be at least two times lower than the average absorption at the other wavelengths in the visible, i.e. 380-470 nm and 500-780 nm, such as at least four times lower. Especially, the absorption in the range of 440-530 nm may in average be at least two times lower than the average of the absorption at the other wavelengths in the visible, i.e. 380-440 nm and 530-780 nm.

Alternatively or additionally, the reflection in the range of 470-500 nm, even more especially in the range of 440-530 nm, may on average be at least two times higher than the average reflection at the other wavelengths in the visible, i.e. 380-470 nm and 500-780 nm, or even more especially in the ranges of 380-440 nm and 530-78 nm, such as at least four times higher, like at least eight times.

Therefore, the light indicator element comprises a light reflecting element configured to reflect at least part of the light illuminating the sensing area having one or more wavelengths selected from the wavelength range of 440-530 nm and configured to absorb at least part of the light illuminating the sensing area having one or more wavelengths in the visible wavelength range outside the wavelength range of 440-530 nm. The sensing area may be a surface of the light reflecting element. The phrase "to reflect at least part of the light illuminating the sensing area having one or more wavelengths selected from the wavelength range of 440-530 nm" may e.g. imply that at this wavelength range there is a reflection band, e.g. having a full width half maximum selected from the range of 10-120 nm.

As will be indicated below, the light indicator may also include a plurality of sensing areas. Hence, the light indicator may in embodiments include a plurality of light indicator elements.

Further, the light indicator comprises a non-sensing area configured adjacent to the sensing area, wherein the non-sensing area has a black color, an off-black color or a shade of gray. An off-black color is a shade of black that differs only slightly from pure black and is considered part of a neutral (achromatic) color scheme. Off-black colors may be considered a subset of shades of gray, i.e. the 'darker' subset of shades of gray. Cf. https://en.wikipedia.org/wiki/Shades_of black. The combination of sensing area and the adjacent non-sensing area may be used to evaluate the intensity of the melanopsin active radiation. The background may be chosen such, that e.g. on the basis of a lightness comparison of the light reflected by the sensing area and non-sensing area, the user can e.g. evaluate whether the melanopic flux is higher or lower than a certain predetermined melanopic flux. The shade of gray of the non-sensing area may be chosen such that a specific melanopic flux may lead to essentially the same lightness at the sensing area and the non-sensing area. Then, the user of the light indicator can check whether at a specific position the flux is larger or lower, based on a comparison of the lightness of the sensing area with the non-sensing area. Is the lightness of the sensing area lower, then the flux is lower than the predetermined melanopic flux; is the lightness of the sensing area higher, then the flux is higher than the predetermined melanopic flux.

Especially, light having wavelengths in the range of 470-500 may have impact on the circadian rhythm as the main absorption of the intrinsically photosensitive retinal ganglion cells may be within this spectral range. Therefore, it may especially be desirable when the reflection of the light absorbing material in the sensing area is at maximum in this wavelength range. Hence, in specific embodiments the light reflecting element has a reflection spectrum having a maximum reflection at a wavelength selected from the wavelength range of 470-500 nm. Yet further, in specific embodiments the light reflecting element has a reflection spectrum having a maximum reflection at a wavelength selected from the wavelength range of 470-500 nm and a full width half maximum selected from the range of 10-120 nm. Further, the absorption outside the range of 470-500 nm, especially outside the range of 440-530 nm, is higher, such as at least two times higher than in the spectral range of 470-500 nm, and 440-530 nm, respectively. The reflection in the reflection spectrum in the visible wavelength range outside the wavelength range of 440-530 nm is on average at least two times smaller than the reflection at the maximum reflection in the wavelength range of 440-530 nm.

In specific embodiments, the light reflecting element reflects at least part of the light illuminating the sensing area in the entire wavelength range of 470-500 nm. Hence, this implies that over this entire wavelength range of 470-500 nm the sensing area is reflective, especially has a reflectivity that at all wavelengths in the range of 470-500 nm is larger than a reflectivity at all wavelengths in the visible outside this range.

The non-sensing area may be black, which may imply an average reflection of 4% or less. Herein, when indicating average values of reflection, it may especially be that at least 80% of the reflection values in the relevant wavelength range is within a +1-50% range of the average reflection percentage value, at least 80% is within the +/−20% range. Below about 20% reflection, it may especially be that at least 80% is within the range of +/−10% (but of course positive). Hence, assuming an average reflection of 8%, then over at least 80% of the relevant range wherein the reflection is averaged, the reflection may be larger than 0% but is equal to or lower than 18%. In embodiments the non-sensing area has an average reflection in the visible wavelength range, thus including the wavelength range of 440-530 nm, selected from the range of 4-80%. Combined with the property that 80% of the reflection values in the visible wavelength range are within a range from the average reflection, this means that the non-sensing area may thus especially have a black color, an off-black color or a shade of gray up to medium and light gray. The non-sensing area may especially provide an essentially neutral background.

The non-sensing and sensing area are adjacent. This may imply that a distance between the areas may in embodiments be at maximum 1 mm, such as at maximum 0.5 mm. The non-sensing area may in embodiments enclose the sensing area. The sensing area may in embodiments be a coating or other type of depositions of the light reflecting element on the non-sensing area, where the area of the latter is larger than of the former (and thus essentially encloses the sensing area). Hence, in embodiments the non-sensing area may also be indicated as "background". The sensing area and non-sensing area may essentially be in the same plane.

As indicated above, the background has a neutral color, especially having a lightness in the range corresponding to the lightness of shades of gray. Hence, the background may especially have a neutral color having a lightness between black and middle gray, or even between black and light gray. Instead of the term "neutral color" also the term "achromatic color" may be applied. Such neutral color may have a chroma ≤5 (in CIELAB space).

In embodiments, the light reflecting element comprises a pigment. Here, the term pigment especially refers to a colored material that is non-white (in view of the herein defined absorption and/or reflectivity features) and that is essentially non-luminescent in the visible (under illumination with solar light).

Note that in specific embodiments the light reflecting element may comprise a photoluminescent material. Alternatively or additionally, the light indicator may comprise a photoluminescent material, optionally in combination with a (black) pigment. In such embodiments, the pigment may be used to control the intensity of light that reaches the photoluminescent material.

However, as indicated above, especially the light reflecting element may comprise a pigment. The pigment may be such that it shows essentially the desired spectral properties. Optionally, optical filters may be applied to adjust the reflection and/or absorption properties. The term "pigment" may also refer to a plurality of different pigments.

A suitable pigment, that may essentially reflect in the spectral range of the melanopsin active radiation and essentially be neutral and absorb light outside the spectral range, may include one or more oxide pigments, such as mixed metal oxide pigments (also known as complex inorganic color pigments). Suitable metals may include one or more of cobalt, iron, trivalent chrome, tin, antimony, titanium, manganese and aluminum. Alternatively or additionally, the pigment may be a chloride, a carbonate, an acetate, or a combination of different salts, with different (complex) anions, while having the same, or a combination of different, (metal) cations (such as a metal as indicated above). In specific embodiments, the pigment comprises a copper salt. Especially, copper salts may have the right color and reflect in the wavelength range of the melanopsin active radiation but (substantially) absorb in other visible wavelengths. In further specific embodiments, the pigment comprises one or more of basic copper carbonate, basic copper chloride, copper hydroxide, and copper(II)acetate. Also combinations thereof and/or mixed salts may be applied. For instance, the pigment may in embodiments comprise $Cu_2CO_3(OH)_2$. Hence, a suitable pigment may be verdigris.

The light reflecting element may in embodiments be a layer (such as a coating), or a plurality of layers (such as a plurality of coatings). The light reflecting element may be a pressed material, a ceramic material, a crystalline material, a polycrystalline material, etc. The light reflecting element may be configured in a transmissive setup, i.e. that part of the melanopsin active light may be transmitted through the light reflecting element or the light reflecting element may essentially be non-transmissive e.g. when the absorption is high enough, for instance by a high pigment content and/or long path length (e.g. in the case of a thick layer).

In specific embodiments, the light reflecting element comprises a light transmissive material, wherein the pigment is embedded in the light transmissive material, optionally together with a second pigment. For instance, the pigment may be dispersed in a polymeric material, or a ceramic material or a glass material, especially a polymeric material, such as PMMA, PET, PC, etc. Such polymeric materials may be light transmissive per se. The light transmissiveness of the light reflecting element may depend upon the thickness of the light reflecting element and the concentration of the pigment in the light reflecting element. Optionally, a second pigment may be applied. The term second pigment may especially refer to a black or white pigment, such as a black pigment, which may be used to provide different shades of the pigment (which may be bluish/green). In specific embodiments, the second pigment is black, like carbon black, or black iron oxide (Mars black), etc.

As indicated above, in embodiments a single sensing area with a (surrounding) non-sensing area may be used for evaluating the flux of melanopsin active radiation. However, it may be helpful to use a plurality of combinations of sensing areas with adjacent non-sensing areas, wherein under illumination with melanopsin active radiation different contrast can be perceived. Herein, a different combination of sensing area and non-sensing area may be selected to determine whether the flux is higher or lower than a predefined level. Basically, in embodiments the reflection of the sensing areas may be varied, and the reflection of the adjacent non-sensing areas may be kept constant, or the reflection of the sensing areas may be kept essentially constant, and the reflection of the adjacent non-sensing areas may be varied. However, combinations may also be applied, and may be comprised in embodiments of the light indicator.

Hence, in embodiments the light indicator may comprise a plurality of light indicator elements with respective sensing areas, wherein two or more sensing areas have mutually different reflectivities for the melanopsin active radiation having one or more wavelengths selected from the wavelength range of 440-530 nm. For instance, the light indicator may comprise 2-8, like 2-6 different sensing areas, all having mutually different reflectivities for the melanopsin active radiation. In these embodiments, the respective non-sensing areas may essentially be identical in reflectivity. Hence, in embodiments there may be essentially a single non-sensing area, enclosing the sensing areas. The sensing areas may especially be configured in an array, such as a linear array.

As indicated above, in embodiments a plurality of sensing areas may have mutually different sensing areas. The different reflectivities may e.g. be obtained, in embodiments, by different combinations of the light reflecting element and another material, such as different concentrations of the pigment in a host material, such as a polymeric material and/or different ratios of the pigment and another material. The other material may be a black pigment and/or a white pigment, such as a black pigment. Hence, a second pigment may be applied. The term "second pigment" may also refer to a plurality of different second pigments. In this way different shades of the bluish-green pigment may be created. Therefore, in embodiments the light indicator may have one or more of sensing areas having a light indicator element comprising a combination of a second pigment and the light reflecting element, the combination reflecting at least part of the light illuminating the sensing area and having one or more wavelengths selected from the wavelength range of 440-530 nm. Especially, in embodiments a black second pigment may be applied.

As indicated above, alternatively essentially the same sensing areas may be provided with each another nonsensing areas. In such embodiments, the non-sensing areas, which may each enclose a sensing area, may have mutually different shades of gray, such as different off-black colors. The off-black colors may essentially be any shade between black and white. Hence, to obtain the non-sensing areas, a white and a black pigment may be used to obtain the desired off-black color.

Therefore, in embodiments the light indicator may comprise a plurality of light indicator elements with respective sensing areas and with non-sensing areas adjacent to the respective sensing areas, wherein two or more sensing areas have (essentially) the same reflectivities for the melanopsin active radiation having one or more wavelengths selected from the wavelength range of 440-530 nm. Especially, the non-sensing areas for the two or more sensing areas have different colors selected from the group consisting of the neutral colors having a lightness in the range corresponding to the lightness of shades of gray. In embodiments, the non-sensing areas for the two or more sensing areas may have different colors selected from the group consisting of the black color, off-black colors and shades of gray. The phrase "two or more sensing areas have the same reflectivities" indicates that these sensing areas have essentially the same or similar reflectivity for different wavelengths in the melanopsin active radiation, such as within about 10% of an average reflectivity across the relevant wavelength range. An advantage of this embodiment may be that the sensing areas may essentially all be the same which may be easier when producing the light indicator.

To tune the reflectivities, e.g. mixtures of pigments may be used; the concentration of the pigment in a binder, such as a polymeric material, may be applied; layered structures may be applied with layers of different material compositions, etc.

The sensing area(s) and the non-sensing area(s) may essentially have the same or similar roughnesses, such as wherein the area with the smaller roughness having a roughness in the range of about 70-100%, like 80-100%, like at least 90% of the roughness of the area having a higher roughness.

Further, in embodiments the sensing area and the non-sensing area may have surface finishes having the same or comparable glossiness, preferably visually the same glossiness, but especially at least in the same gloss category (matte, satin, semi-gloss, high-gloss). Hence, in specific embodiments the sensing area and the non-sensing area have surface finishes having comparable glossiness, preferably visually the same glossiness, but at least in the same gloss category (matte, satin, semi-gloss, high-gloss). In further specific embodiments, the glossinesses (of the surface finishes) of the sensing area and non-sensing area are at maximum 30 GU.

A combination of non-sensing area and sensing area may show under a specific flux of the melanopsin active radiation no lightness contrast but at the smallest deviating flux also the smallest lightness contrast. Hence, to a combination of non-sensing area and sensing area a predetermined flux and/or qualitative indication may be attributed. Hence, the light indicator may include information for evaluating the perceived difference in lightness for the one or more combinations of sensing area and non-sensing area. Alternatively, such indications may be included in a separate manual, on a package of the light indicator, or on another package. Also a link to such information may be provided. For instance, the link may be provided as QR code or another type of (matrix) bar code. Therefore, in a further aspect there is provides a kit of parts comprising the light indicator as described herein and reference information. The reference information may (i) be available on one or more of the light indicator, a data carrier, and another tangible element and/or may (ii) be accessible on the internet via a reference to an internet site, wherein the reference is available on one or more of the light indicator, a data carrier, and another tangible element, and wherein the reference information contains information allowing one or more of a qualitative analysis and a quantitative analysis of the melanopic flux on a sensing area. Hence, the reference information or a reference to such reference information may be available on one or more of the light indicator, a data carrier, and another tangible element. In embodiments, the other tangible element may be selected from the group consisting of a manual of the light indicator and a package of the light indicator. Yet, in further embodiments, the other tangible element is selected from the group consisting of a manual of a lighting device and a package of a lighting device. In specific embodiments, the kit of parts may (further) include a lighting device, a package of lighting device, or a package of a lighting device including such lighting device.

As indicated above, in embodiments the light indicator may thus comprises a plurality of light indicator elements as defined herein, and the reference information contains information allowing a user to perform one or more of a qualitative analysis and a quantitative analysis of the flux of melanopsin active radiation on one or more of the sensing areas of the plurality of light indicator elements.

For instance, the reference information may contain information allowing a user (after visual inspection of the combination of sensing area and non-sensing area) to perform one or more of a qualitative analysis and a quantitative analysis based on a determination by the user of a (smallest) contrast between one of the sensing areas and the adjacent non-sensing area.

The light indicator may e.g. be used at home, in an office, a plant, a public space, etc., and may be used to assess whether e.g. the flux of melanopsin active radiation at a certain location is as desired, or is too high, or is too low.

The term "radiation" herein especially refers to light having a wavelength in the visible wavelength range.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Amongst others, the invention provides e.g. a visual indicator, consisting of multiple patches (herein also indicated as light indicator elements) of a pigment on a black background, where the reflectance curve of the pigment closely resembles the absorbance of the melanopsin pigment, and the patches each are set to varying reflectance levels (e.g. 20%, 40%, 60%, 80% and 100%). An accompanying table, may be provided, where the user (after visual inspection of the patches) can get an indication of the overall amount of melanopic activity of the current illuminant, based on the last patch that is still discernible from the background.

Figure 1A:
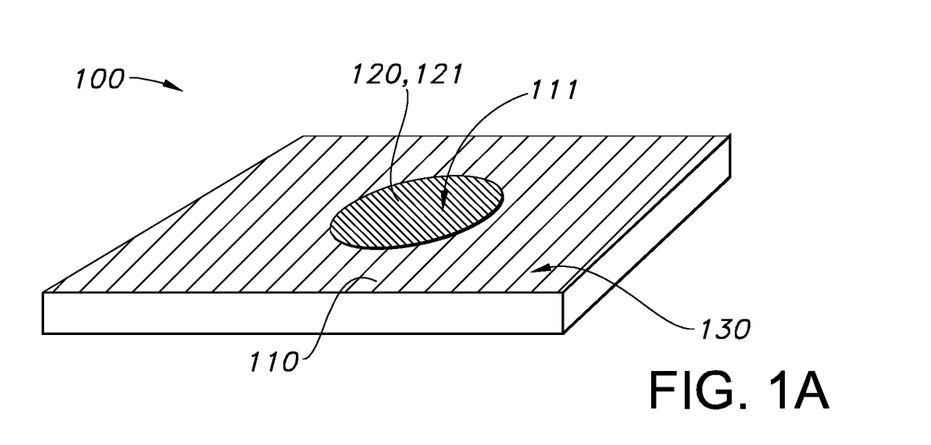
FIGS. 1a-1d schematically depict some embodiments and variants.

FIG. 1a schematically depicts an embodiment of a light indicator 100 for use in evaluating the melanopic flux. The light indicator 100 comprises a light indicator element 110 and a non-sensing area 130. The light indicator element 110 comprises the sensing area 111. The light indicator element 110 comprises a light reflecting element 120 configured to reflect at least part of light illuminating the sensing area 111 having one or more wavelengths selected from the wavelength range of 440-530 nm and configured to absorb at least part of light illuminating the sensing area 111 having one or more wavelengths in the visible wavelength range outside the wavelength range of 440-530 nm. The non-sensing area 130 is configured adjacent to the sensing area 111, wherein the non-sensing area 130 has a black color, an off-black color or a shade of gray. The light reflecting element 120 may in embodiments comprise a pigment 121, for instance one or more of basic copper carbonate, basic copper chloride, copper hydroxide, and copper(II)acetate.

Figure 1B:
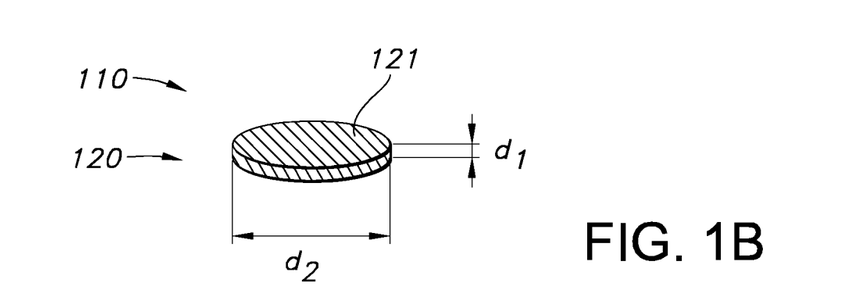
Figure 1C:
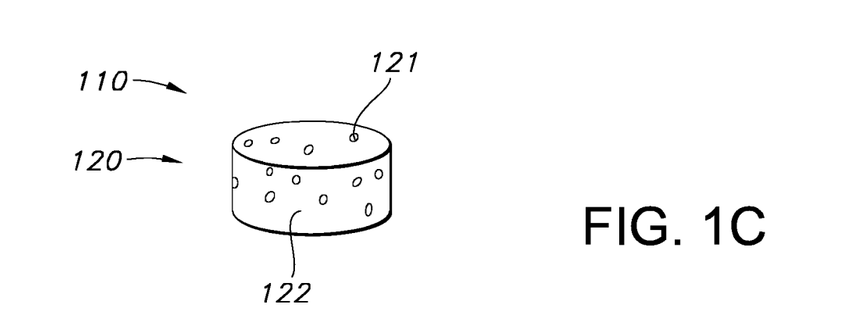
Figure 1D:
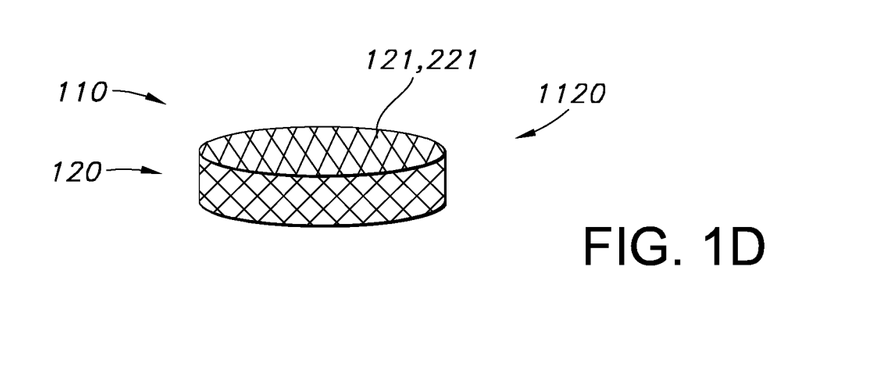

FIGS. 1b and 1c schematically depict some variants of the light indicator element 110, for instance a layer of absorbing and reflective material, i.e. reflective in at least part of the wavelength range of 440-530 nm and absorbing over essentially the entire visible range outside the range of 440-530 nm. Within this range of 440-530 nm the light reflecting element may also absorb light, but to a lower extent, especially an essentially lower extent, than outside this range. FIG. 1c schematically depicts an embodiment wherein the light reflecting element 120 comprises a light transmissive material 122, wherein the pigment is embedded in the light transmissive material 122, optionally together with a second pigment.

Hence, in embodiments the visual indicator may comprise at least one patch, where at least one of the patches will be created such that the patch will be just discernible from the background for a predetermined melanopic lux level, such as at or over 100.

Figure 2A:
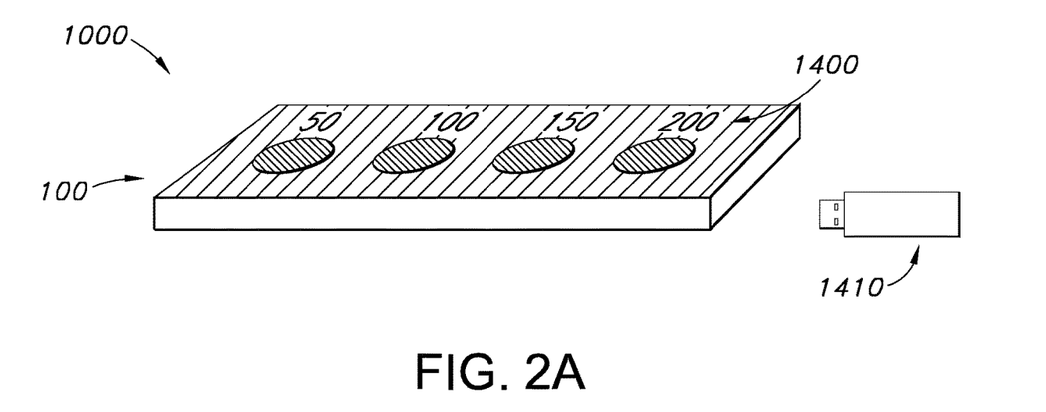
FIGS. 2a-b schematically depict some further embodiments and variants.
Figure 2B:
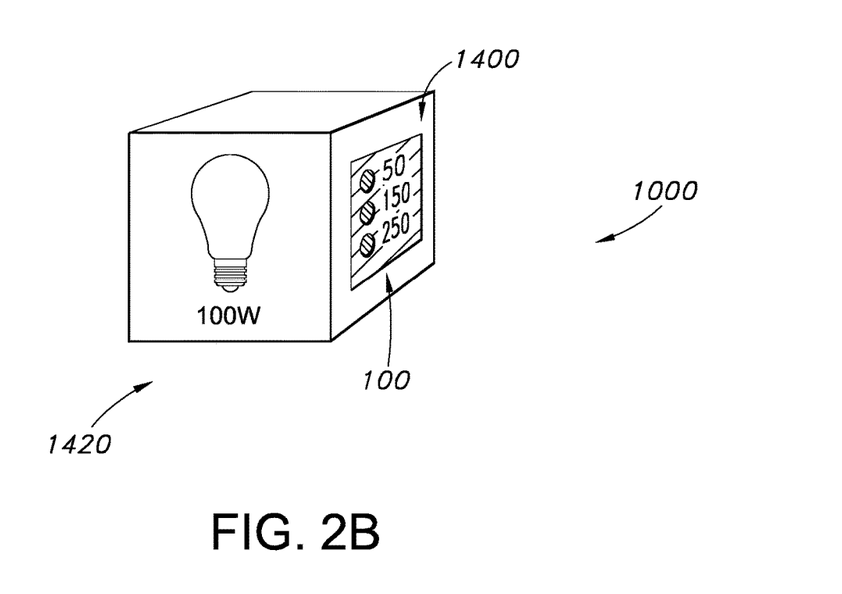

FIGS. 2a-2b schematically depict embodiments of the light indicator 100, comprising a plurality of light indicator elements 110 with respective sensing areas 111, wherein two or more sensing areas 111 have mutually different reflectivities for the melanopsin active radiation having one or more wavelengths selected from the wavelength range of 440-530 nm. Especially, one or more of the light indicator elements 110 may comprise a combination of a second pigment and the light reflecting element 120, the combination having a reflection of at least part of light illuminating the sensing area 111 having the one or more wavelengths selected from the wavelength range of 440-530 nm. These figures also show embodiments of a kit of parts 1000 comprising such light indicator 100 and reference information 1400 on a carrier or a reference to such reference information 1400 on a carrier. The reference information 1400 may be (i) available on one or more of the light indicator 100, see FIG. 2a, a data carrier 1410, see also FIG. 2a, and another tangible element 1420, see FIG. 2b, and/or (ii) which is accessible on the internet via a reference to an internet site, wherein the reference is available on one or more of the light indicator 100, a data carrier 1410 see also FIG. 2a as possible variant, and another tangible element 1420, and wherein the reference information 1400 contains information allowing one or more of a qualitative analysis and a quantitative analysis of the melanopic flux on a sensing area 111. Reference 1410 in FIG. 2a may e.g. be a USB stick with reference information 1400 or with a link to such reference information. Reference 1420 in FIG. 2b may e.g. be a package of a lamp. By using the light indicator 100 on the package, and the reference information 1400 on the package, one may evaluate the melanopsin active radiation flux at a location in a space where the lamp is configured.

Figure 3A:
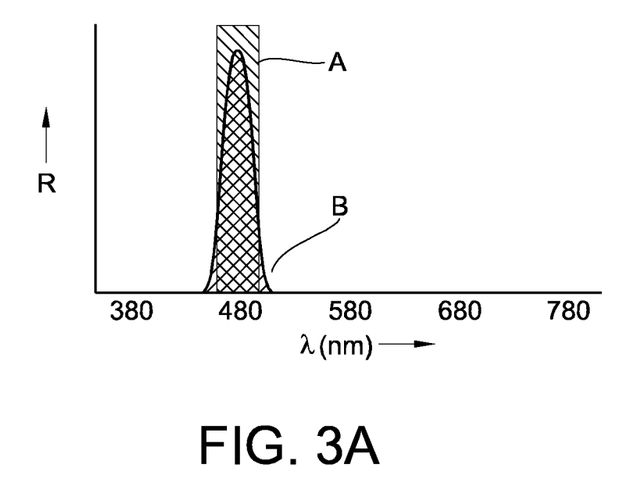
FIGS. 3a-3b schematically depict some aspects.

As indicated above, the current invention proposes—amongst others—a system (e.g. in the form of a 'color' checker chart) that provides an estimation of the absolute amount of short wavelength energy (440-530 nm) in a given spectrum. The chosen wavelength range corresponds to the peak sensitivity of ipRGCs. FIG. 3a illustrates a possible principle for the current invention in an example of execution, with a pigment with reflectance properties peaking in the 440-530 nm range, coinciding with the melanopic sensitivity curve. However, the current invention is not limited to use with a color checker chart but could also be applied using a smart device, e.g. a smartphone or tablet. Here, the camera of the smart device acts as a sensor and provides an estimation of the amount of short wavelength energy in a given spectrum. Reference A in FIG. 3a indicates the relevant wavelength band, such as about 470-500 nm; reference B schematically indicates the pigment reflectance, with on the y-axis the reflectance, and on the x-axis the wavelength (nm).

Figure 3B:
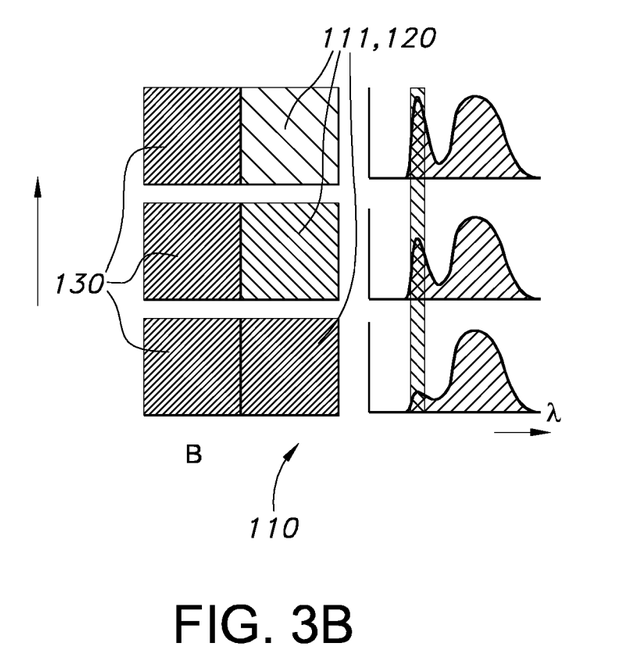

Application of the principle of the current invention may be straightforward. When used as a color checker chart, the melanopic activity checker is held under a given illuminant. Then, by visual inspection, one can deduce the amount of melanopic activity for this spectrum. The invention is not meant to provide a high precision, but instead will take a more categorical approach to give an indication of 'low melanopic activity' vs. 'high melanopic activity' (see the arrow in FIG. 3b), depending on the application. An example hereof is provided in FIG. 3b. Two patches are provided, when the illuminant has a low melanopic activation, the two patches appear identical. When the illuminant has a higher melanopic activation however (top of FIG. 3b), the patch on the right appears different. FIG. 3b schematically shows an embodiment of a patch usage. The left of the figure shows two pigments (black pigment and 'melanopic' pigment) under various illuminants. The right of the figure shows simplified examples of spectral power distributions, with low melanopic activation (bottom) and higher melanopic activation (top).

The effectiveness of a given light spectrum in suppressing melatonin production can be expressed in terms of the melanopsin effectiveness factor (MEF). This factor is calculated by multiplying the spectral power distribution of the light emitted by a lighting system (SPD($\lambda$)) with the melanopic sensitivity function (m($\lambda$)) divided by the product of SPD($\lambda$) and the photopic sensitivity (V($\lambda$)), normalized by the areas under the curves of m($\lambda$) and V($\lambda$), see equation 1 (and see also e.g. WO2016146688, which is herein incorporated by reference, especially FIG. 1 from this reference and the accompanying information):

$$\text{MEF}=(\int_\lambda V(\lambda)d\lambda\int_\lambda m(\lambda)d\lambda)\cdot(\int_\lambda \text{SPD}(\lambda)m(\lambda)d\lambda\int_\lambda \text{SPD}(\lambda)V(\lambda)d\lambda) \quad (\text{eq. 1})$$

This can be simplified to $$\text{MEF}=1.22(\int_\lambda \text{SPD}(\lambda)m(\lambda)d\lambda\int_\lambda \text{SPD}(\lambda)V(\lambda)d\lambda) \quad (\text{eq. 2})$$

as $$\text{MEF}=1.22\Sigma_{\lambda=380}^{780}\text{SPD}(\lambda)m(\lambda)\Delta\lambda/\Sigma_{\lambda=380}^{780}\text{SPD}(\lambda)V(\lambda)\Delta\lambda \quad (\text{eq. 3})$$

Hence, the above indicated summations are over the visible range of 380-780 nm. By definition, the MEF for an equi-energy light source $\text{MEF}_{EE}$ equals 1. Especially, an equi-energy light source has SPD(lambda)=constant (for instance 1) for all (visible) wavelengths.

The biological effects of light on humans can alternatively be measured in Equivalent Melanopic Lux (EML), a proposed alternate metric that is weighted to the ipRGCs instead of to the cones, which is the case with traditional lux. The alternative metric is disclosed in the WELL Building Standard v1 with Q4 2017 addenda, downloadable at https://www.wellcertified.com/sites/default/files/resources/WELL%20Building%20Standard%20v1%20with%202017%20Q4%20addenda.pdf and incorporated herein by reference.

Figure 4A:
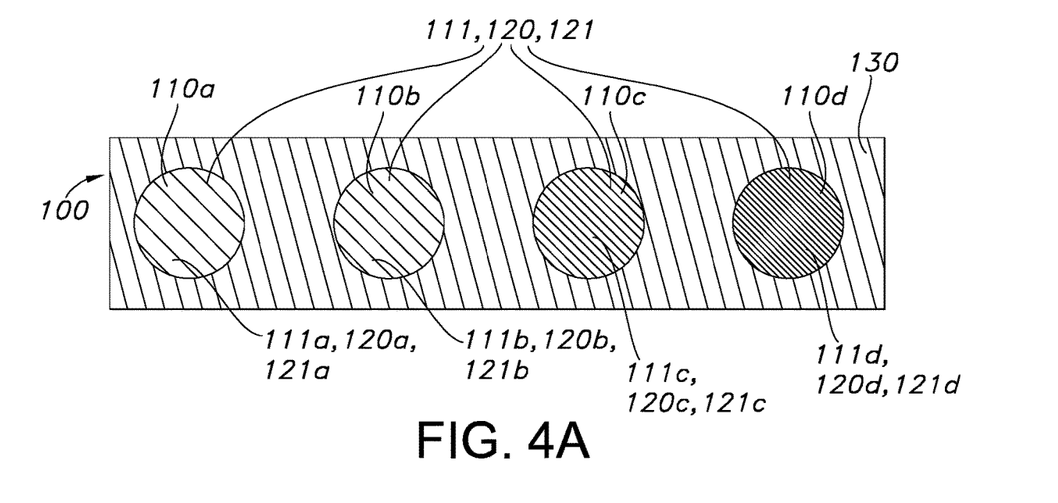
FIGS. 4a-4d also schematically depict some aspects and embodiments.
Figure 4B:
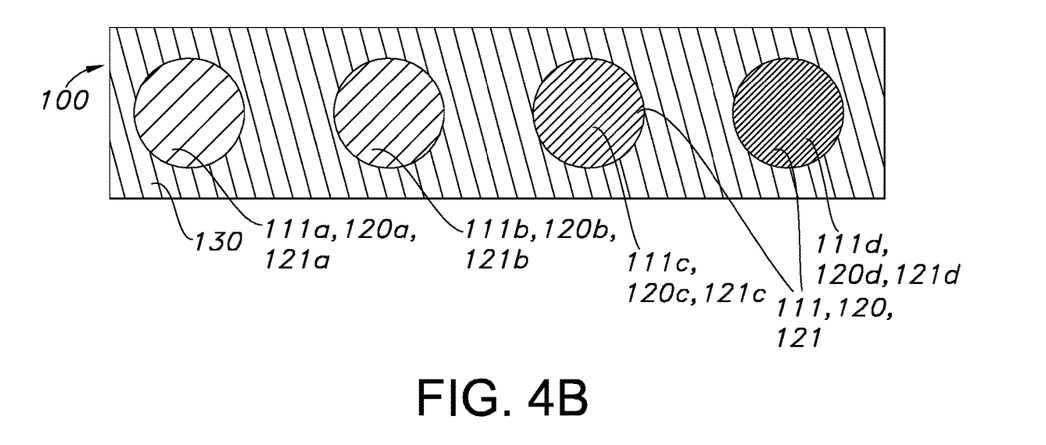

In FIGS. 4a-4b the indicates a, b, c, and d after references 111, 120, and 121 indicate the respective sensing areas, absorbing element, and pigments. Note that for all sensing areas the adjacent non-sensing area is identical. Hence, effectively there is in these embodiments a single non-sensing area 130 with a plurality of sensing areas 120 (i.e. 120a, 120b, 120c, 120d, . . . ). Here, by way of example 4 sensing areas 120 are depicted. However, more or less sensing areas 120 may be used.

Figure 4C:
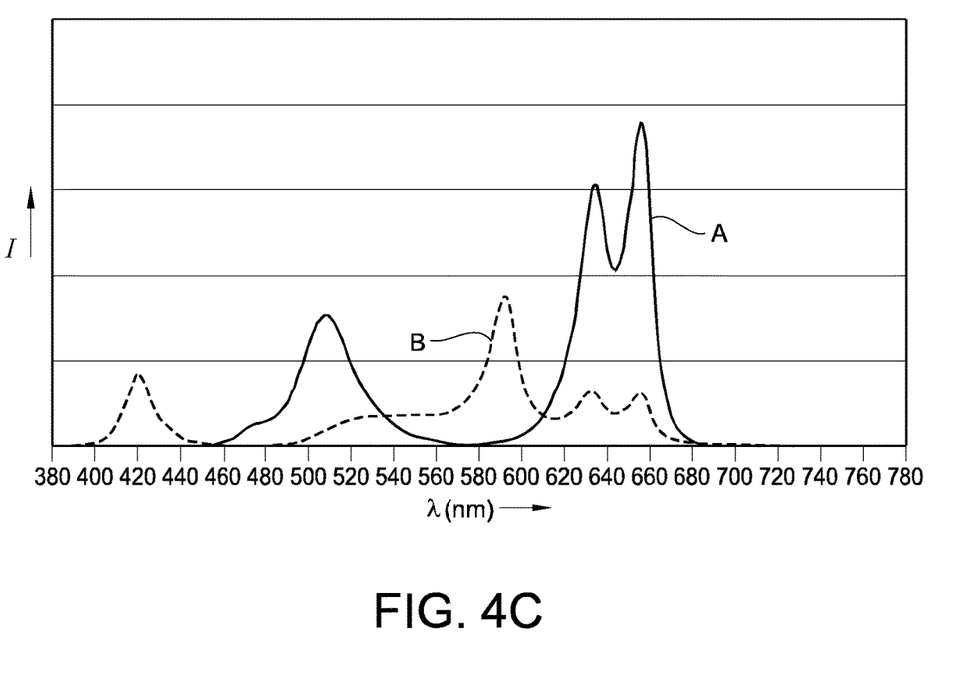

FIG. 4c shows the low (curve B) and high MEF (curve A) spectrum used in the rendering in FIGS. 4a and 4b, respectively. Both spectra are at identical lux levels (~175 lux), but differ in MEF levels. The high MEF spectrum (curve A) has a MEF of 1.07, whereas the low MEF spectrum (curve B) has a MEF of 0.3.

Hence, amongst others the invention provides a visual indicator comprising: multiple patches of a pigment on a black background where the reflectance curve of the pigment closely resembles the absorbance of the melanopsin photoreceptor and where the patches each are set to varying reflectance levels (e.g. 20%, 40%, 60%, 80%, 100%) and; an accompanying table where the user (after visual inspection of the patches) can get an indication of the overall amount of melanopic activity of the current illuminant based on the last patch that is still discernible from the background; the indicator providing a "ballpark" estimate of the melanopic activity of a light source allowing the user to determine whether this light source meets or exceeds a specific criteria.

Figure 4D:
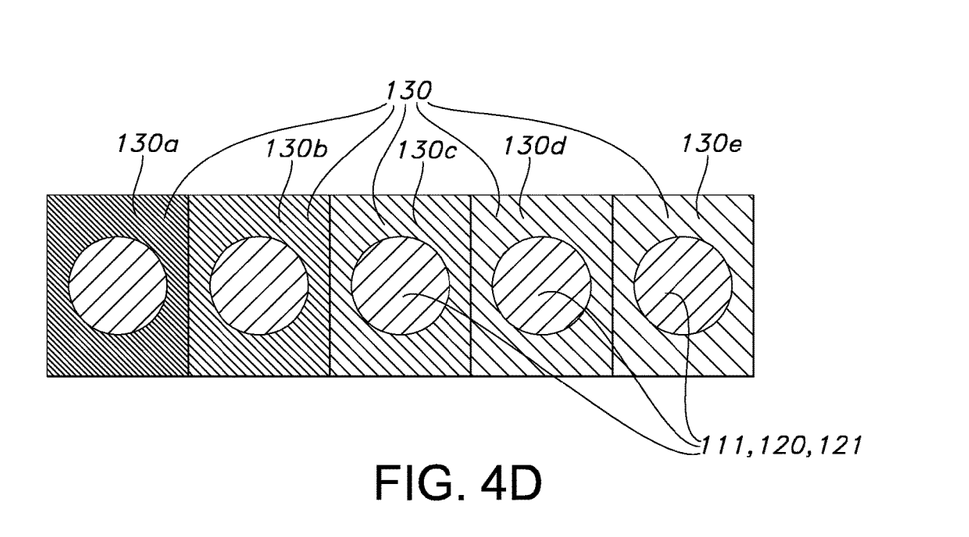

An alternative embodiment is schematically depicted in FIG. 4d. Here, the light indicator 100 comprises a plurality of light indicator elements 110 with respective sensing areas 111 and with non-sensing areas 130 adjacent to the respective sensing areas 111, wherein two or more sensing areas 111 have the same reflectivities for the melanopsin active radiation, especially having one or more wavelengths selected from the wavelength range of 440-530 nm. The non-sensing areas 130 for the two or more sensing areas 111 have different colors selected from the group consisting of black color, off-black colors and shades of gray. The different non-sensing areas 130 are indicated with references 130*a*, 130*b*, 130*c*, 130*d*, 130*e*, . . . , respectively. More or less than five combinations may be applied. The different shades can be obtained with different mixing ratios of a black and a white pigments. The neutral color(s) having a lightness in the range corresponding to the lightness of shades of gray can be obtained with different mixing ratios of a black and a white segment.

Figure 5B:
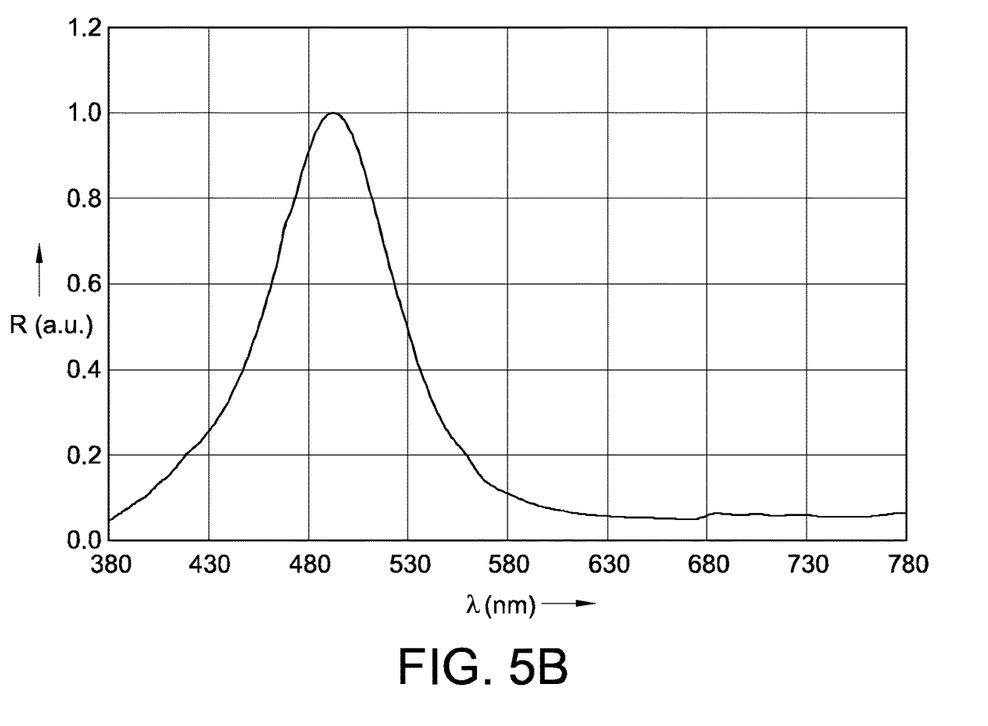
FIG. 5b shows a normalized reflection spectrum of copper acetate.

FIG. 5*a* shows the normalized absorption spectrum of the melanopsin pigment in the human eye, corrected for the transmission of the lens and the interocular media, for a representative age and macular pigment density;

FIG. 5*b* shows a normalized reflection spectrum of copper acetate. As can be derived from the figure, the similarity to the absorption spectrum of the melanopsin photoreceptor is very good. Hence, this pigment may very well be applied in a comparative test as described herein.

The term "plurality" refers to two or more.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A kit of parts comprising:
   a light indicator for use in evaluating a quantity of melanopsin active radiation, wherein the melanopic active radiation comprises radiation having one or more wavelengths selected from the wavelength range of 440-530 nm, the light indicator comprising:
   a light indicator element comprising a sensing area, wherein the light indicator element comprises a light reflecting element configured to reflect at least part of light illuminating the sensing area having one or more wavelengths selected from the wavelength range of an absorption band of melanopsin in the visible wavelength range and configured to absorb at least part of light illuminating the sensing area having one or more wavelengths in the visible wavelength range outside the wavelength range of the absorption band of melanopsin in the visible wavelength range,
   wherein the absorption band of melanopsin in the visible wavelength range is 440-530 nm and wherein an average reflection of the light at the sensing area in the wavelength range of the absorption band of melanopsin in the visible wavelength range is at least two times higher than an average reflection at the other wavelengths in the visible wavelength range; and
   a non-sensing area configured adjacent to the sensing area, wherein the non-sensing area has an achromatic color having a lightness in the range corresponding to shades of gray, wherein an achromatic color has a chroma ≤5 in CIELAB space; and
   reference information or a reference to such reference information which is available on one or more of the light indicator, a data carrier, and another tangible element, and wherein the reference information contains information allowing one or more of a qualitative analysis and a quantitative analysis of a quantity of melanopsin active radiation on the sensing area of the light indicator.

2. The kit of parts according to claim 1, wherein the quantity of melanopsin active radiation is a melanopic flux or a melanopic illuminance.

3. The kit of parts according to claim 1, wherein
   the light reflecting element has a reflection spectrum having a reflection band with a maximum having a wavelength selected from the wavelength range of 470-500 nm and having a full width half maximum selected from the range of 10-120 nm, and wherein the reflection in the reflection spectrum in the visible wavelength range outside the wavelength range of 440-530 nm is in average at least two times smaller than the reflection at the maximum of the reflection band; and the non-sensing area has an average reflection in the visible wavelength range outside the wavelength range of 440-530 nm selected from the range of 4-80%.

4. The kit of parts according to claim 1, wherein the light reflecting element comprises a pigment.

5. The kit of parts according to claim 4, wherein the pigment comprises one or more of basic copper carbonate, basic copper chloride, copper hydroxide, and copper(II) acetate.

6. The kit of parts according to claim 4, wherein the light reflecting element comprises a light transmissive material, wherein the pigment is embedded in the light transmissive material.

7. The kit of parts according to claim 4, wherein the light reflecting element further comprises a second pigment, wherein the second pigment is black.

8. The kit of parts according to claim 1, wherein the light indicator comprising a plurality of light indicator elements with respective sensing areas, wherein two or more sensing areas have mutually different reflectivities for the melanopsin active radiation having one or more wavelengths selected from the wavelength range of 440-530 nm.

9. The kit of parts according to claim 8, and wherein the reference information contains information allowing a user one or more of a qualitative analysis and a quantitative analysis of the quantity of melanopsin active radiation on one or more of the sensing areas of the plurality of light indicator elements.

10. The kit of parts according to claim 9, wherein the reference information contains information allowing a user to perform the one or more of the qualitative analysis and the quantitative analysis by visual determination of a smallest contrast between one of the sensing areas and the non-sensing area.

11. The kit of parts according to claim 9, wherein the other tangible element is selected from the group consisting of a manual of the light indicator and a package of the light indicator.

12. The kit of parts according to claim 9, wherein the other tangible element is selected from the group consisting of a manual of a lighting device and a package of a lighting device.

13. The kit of parts according to claim 1, wherein the light indicator comprising a plurality of light indicator elements with respective sensing areas and with non-sensing areas adjacent to the respective sensing areas, wherein two or more sensing areas have the same reflectivities for the melanopsin active radiation having one or more wavelengths selected from the wavelength range of 440-530 nm, and wherein the non-sensing areas for the two or more sensing areas have different colors selected from the group consisting of the neutral colors having a lightness in the range corresponding to the lightness of shades of gray.

* * * * *